United States Patent
Sylvester et al.

(10) Patent No.: US 10,007,292 B2
(45) Date of Patent: Jun. 26, 2018

(54) ENERGY AWARE DYNAMIC ADJUSTMENT ALGORITHM

(71) Applicant: QUALCOMM Incorporated, San Diego, CA (US)

(72) Inventors: Lucille Garwood Sylvester, Boulder, CO (US); Navid Farazmand, Marlborough, MA (US); Brian Salsbery, Superior, CO (US); Jeremy Gebben, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/170,615

(22) Filed: Jun. 1, 2016

(65) Prior Publication Data

US 2017/0199542 A1    Jul. 13, 2017

Related U.S. Application Data

(60) Provisional application No. 62/277,380, filed on Jan. 11, 2016.

(51) Int. Cl.
*G06F 1/00*    (2006.01)
*G06F 1/08*    (2006.01)
*G06F 13/16*   (2006.01)
*G06T 1/20*    (2006.01)

(52) U.S. Cl.
CPC .............. *G06F 1/08* (2013.01); *G06F 13/16* (2013.01); *G06T 1/20* (2013.01); *G06T 2200/28* (2013.01); *Y02D 10/14* (2018.01)

(58) Field of Classification Search
CPC ..... G06F 1/08; G06F 13/16; G06T 1/20; G06T 2200/28; Y02B 60/1228
See application file for complete search history.

(56) References Cited

U.S. PATENT DOCUMENTS

| | | | |
|---|---|---|---|
| 7,634,668 B2 | 12/2009 | White et al. | |
| 8,621,253 B1 | 12/2013 | Brown et al. | |
| 8,856,566 B1 | 10/2014 | Jane | |
| 8,924,758 B2 | 12/2014 | Steinman et al. | |
| 9,063,730 B2 | 6/2015 | Dighe et al. | |
| 9,250,665 B2 | 2/2016 | Avkarogullari et al. | |
| 2008/0082844 A1 | 4/2008 | Ghiasi et al. | |
| 2012/0306558 A1 | 12/2012 | Singvall et al. | |
| 2014/0089699 A1* | 3/2014 | O'Connor | G06F 1/324 713/322 |
| 2014/0215241 A1 | 7/2014 | Yoon et al. | |
| 2015/0082076 A1 | 3/2015 | Jagmag et al. | |

(Continued)

OTHER PUBLICATIONS

U.S. Appl. No. 15/238,267, by Navid Farazmand, filed Aug. 16, 2016.

(Continued)

*Primary Examiner* — Austin Hicks
(74) *Attorney, Agent, or Firm* — Shumaker & Sieffert, P.A.

(57) ABSTRACT

Example implementations and techniques are described in which a processor uses a dynamic adjustment algorithm, including algorithms based on performance and energy models, to readjust frequency settings for a graphics processing unit (GPU), and independently for a system memory or for a system memory bus, to an optimal level for meeting sustained performance requirements with the low level of power consumption.

20 Claims, 6 Drawing Sheets

(56) References Cited

U.S. PATENT DOCUMENTS

2015/0095620 A1     4/2015   Ananthakrishnan et al.
2015/0309779 A1   10/2015   Baskaran et al.
2015/0378424 A1   12/2015   Anyuru

OTHER PUBLICATIONS

Office Action from U.S. Appl. No. 15/238,267, dated Dec. 12, 2017, 18 pp.
Response to Office Action dated Dec. 12, 2017, from U.S. Appl. No. 15/238,267, filed Mar. 7, 2018, 10 pp.

* cited by examiner

ENERGY AWARE DYNAMIC ADJUSTMENT ALGORITHM

RELATED APPLICATIONS

This application claims the benefit of U.S. Provisional Application Ser. No. 62/277,380, filed Jan. 11, 2016, the entire contents of which is hereby incorporated by reference herein.

TECHNICAL FIELD

This disclosure relates to clock rate adjustments, and more particularly, to clock rate adjustments of a graphics processing unit and a system memory bus.

BACKGROUND

Mobile devices are powered by batteries of limited size and/or capacity. Typically, mobile devices are used for making phone calls, checking email, recording/playback of a picture/video, listening to radio, navigation, web browsing, playing games, managing devices, and performing calculations, among other things. Many of these actions utilize a graphics processing unit (GPU) to perform some tasks and use a bus to transfer data to and from a system memory. Example GPU tasks include the rendering of content to a display and performing general compute computations (e.g., in a general purpose GPU (GPGPU) operation). Therefore, the GPU is typically a large consumer of power in mobile devices. As such, it is beneficial to manage the power consumption of the GPU, as well as system memory, in order to prolong battery life.

SUMMARY

In general, the disclosure describes techniques for proactively and dynamically adjusting a frequency of a clock signal of a graphics processing unit (GPU), a system memory bus (DDR), or both a GPU and a DDR.

Various examples include a method of clock rate determination comprising: determining, with a host processor, an actual timeline for completing a given workload by a graphics processing unit (GPU); determining, with the host processor, an error value based on comparing the actual timeline to an estimated timeline for completing the given workload; determining whether at least the GPU and a system memory bus are operating at a stable workload level based on the error value, wherein the stable workload level indicates that no significant changes in a system workload level have occurred over a plurality of workload samples processed by the GPU; invoking, with the host processor, a first transfer function based on a determination that the GPU and the system memory bus are operating at the stable workload level; determining, with the host processor and using the first transfer function, a first clock rate for the GPU and a second clock rate for the system memory bus based on the determination that the GPU and the system memory bus are operating at the stable workload level; and setting a clock rate of the GPU to the first clock rate and a clock rate of the system memory bus to the second clock rate.

Various examples include a device for clock rate determination comprising: a graphics processing unit (GPU) configured to operate at a first clock rate, the first clock rate being adjustable; a system memory bus coupled to the GPU, the system memory bus configured to operate at a second clock rate, the second clock rate configured to be adjustable independently of the first clock rate; and a host processor configured to: determine an actual timeline for completing a given workload by the GPU; determine an error value based on comparing the actual timeline to an estimated timeline for completing the given workload; determine whether at least the GPU and the system memory bus are operating at a stable workload level based on the error value, wherein the stable workload level indicates no significant changes in a system workload level have occurred over a plurality of workload samples; invoke a first transfer function based on a determination that the GPU and the system memory bus are operating at the stable workload level; determine, using the first transfer function, the first clock rate for the GPU and the second clock rate for the system memory bus based on the determination that the GPU and the system memory bus are operating at the stable workload level; and set a clock rate of the GPU to the first clock rate and a clock rate of the system memory bus to the second clock rate.

Various examples include a system for cloak rate determination comprising: means for determining an actual timeline for completing a given workload by the GPU; means for determining an error value based on comparing the actual timeline to an estimated timeline for completing the given workload; means for determining whether at least the GPU and a system memory bus are operating at a stable workload level based on the error value, wherein the stable workload level indicates that no significant changes in a system workload level have occurred over a plurality of workload samples processed by the GPU; means for invoking a first transfer function based on a determination that the GPU and the system memory bus are operating at a stable workload level; means for determining, using the first transfer function, a first clock rate for the GPU and a second clock rate for the system memory bus based on the determination that the GPU and the system memory bus are operating at the stable workload level; and means for setting a clock rate of the GPU to the first clock rate and a clock rate of the system memory bus to the second clock rate.

Various examples include a non-transitory computer readable medium comprising instructions for causing a programmable processor to: determine an actual timeline for completing a given workload by a graphic processing unit (GPU); determine an error value based on comparing the actual timeline to an estimated timeline for completing the given workload; determine whether at least the GPU and a system memory bus are operating at a stable workload level based on the error value, wherein the stable workload level indicates that no significant changes in a system workload level have occurred over a plurality of workload samples processed by the GPU; invoke a first transfer function based on the determination that the GPU and the system memory bus are operating at the stable workload level; determine, using the first transfer function, a first clock rate for the GPU and a second clock rate for the system memory bus based on the determination that the GPU and the system memory bus are operating at the stable workload level; and set a clock rate of the GPU to the first clock rate and a clock rate of the system memory bus to the second clock rate.

The details of one or more examples are set forth in the accompanying drawings and the description below. Other features, objects, and advantages will be apparent from the description, drawings, and claims.

DETAILED DESCRIPTION

Figure 1:
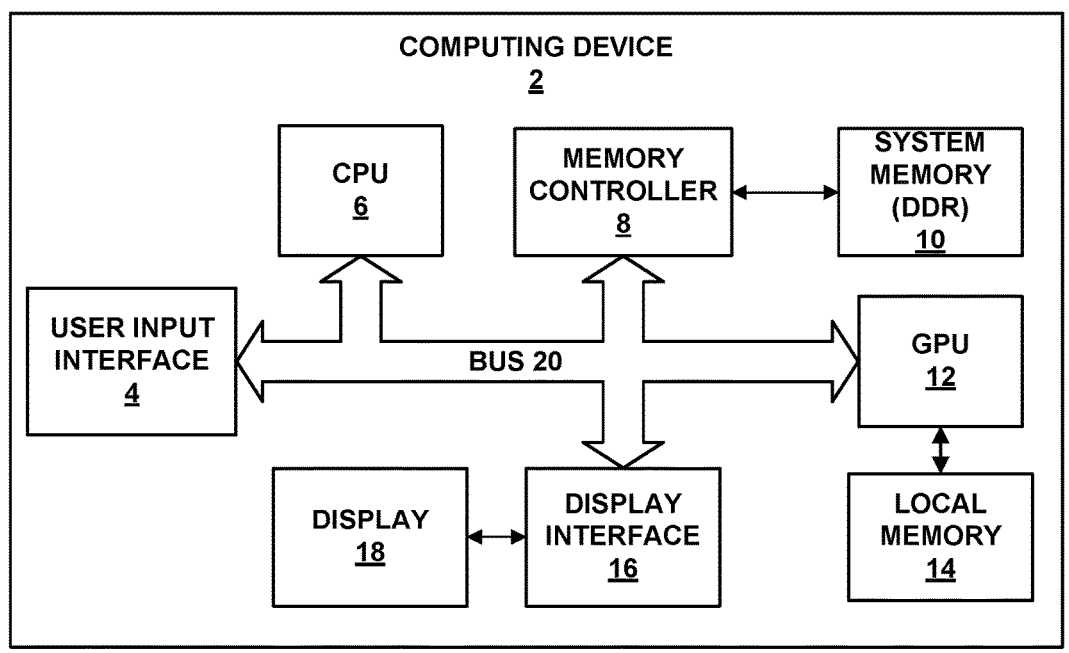
FIG. 1 is a block diagram illustrating an example device for processing data in accordance with one or more example techniques described in this disclosure.

A processing unit, such as a graphics processing unit (GPU), includes an internal clock that sets the rate at which the GPU processes instructions (e.g., sets the operation frequency of the GPU). A higher clock rate sometimes (but not always) results in higher power consumption by the GPU, but allows the GPU to process more commands per second. In other words, a higher clock rate allows the GPU to provide higher performance, but in various configurations at the cost of higher power consumption. In some configurations, a lower clock rate can result in less power consumption by the GPU, but reduces the number of commands the GPU can process per second.

Example implementations described herein include a performance tracker circuit that is operable to invoke one or more transfer functions in order to determine adjustments that can be made to the operating frequency of a GPU, to the operating frequency of a system memory bus associated with system memory utilized by the GPU, or the operating frequencies for both the GPU and the system memory bus associated with the system memory. The performance tracker circuit is operable to monitor the system workload level of the GPU and the system memory bus, and to issue new frequency requests to adjust the operating frequencies of the GPU and/or the system memory bus in response to shifts in the system workload levels of the GPU and the system memory bus. In addition, the performance tracker circuit is operable to determine that the system workload level is stable, and during the stable system workload periods, to invoke one or more transfer functions to determine if a more optimal operating point for the operating frequency of the GPU, the operating frequency of the system memory bus, or the operating frequencies for both the GPU and the system memory bus are available. If such a more optimal operating point is determined to exist under these stable system workload periods, the performance tracker circuit is operable to adjust the operating frequency of the GPU, the system memory bus, or both the GPU and system bus to allow the GPU and memory system to operate at the more optimal operating point.

In various examples, a host processor (e.g., central processing unit (CPU)) determines the frequency at which the GPU should operate using the example implementations and techniques described herein. As described above, having the GPU operating at a higher frequency in some examples results in fast completion, but in some configurations at the cost of extra power consumption. Accordingly, the host processor in most instances attempts to set the operation frequency of the GPU to keep power consumption low without impacting timely completion of tasks and the GPU workload.

This disclosure describes example implementations and techniques operable to proactively and dynamically adjust the clock rate of the GPU (e.g., adjust the operating frequency of the GPU), or proactively and dynamically adjust the clock rate of the DDR (e.g., adjust the operation frequency of the DDR), or proactively and dynamically adjust the clock rate of both the GPU and the DDR.

In some other systems, GPU and DDR frequency control is often governed by algorithms that guess if a set of frequencies will be performant enough and power optimal. Incorrect frequency selection strongly penalizes performance, so only a few operating points or frequency sets are ever checked in these conventional systems. The compromise to enable optimal performance generally comes at the expense of energy being wasted by these conventional systems.

Figure 2:
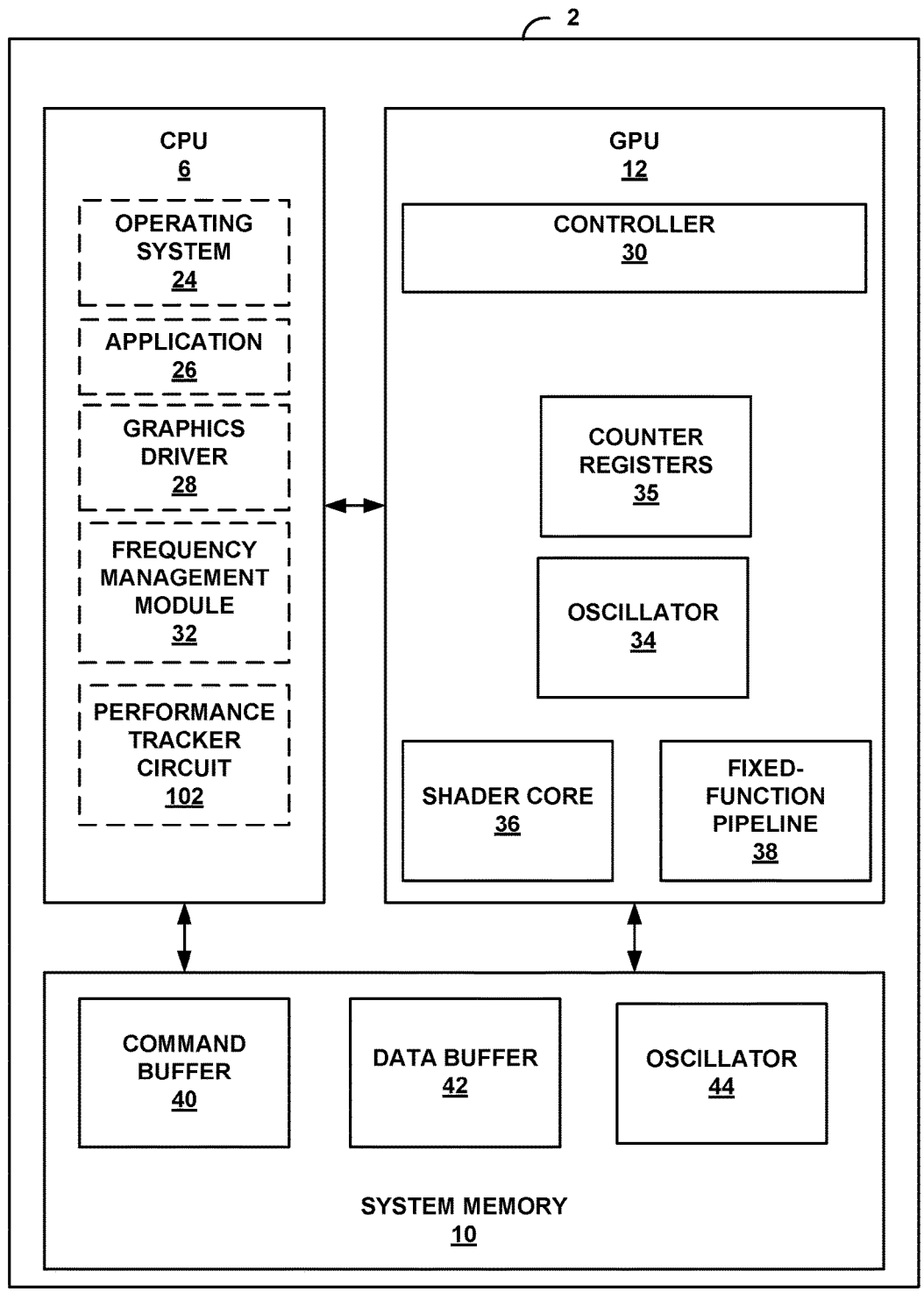
FIG. 2 is a block diagram illustrating components of the device illustrated in FIG. 1 in greater detail.

This disclosure describes a Dynamic Adjustment Algorithm (DAA). The algorithm uses performance and energy models to readjust initial frequency sets for a GPU/DDR system to a more optimal level for sustained performance with the low power consumption. In various examples, the Dynamic Adjustment Algorithm includes one or more performance models and one or more energy models that are utilized by transfer functions call by the DAA to determine and set operating frequencies for the GPU, the DDR, or both the GPU and the DDR. As described below in more detail for example with respect to FIG. 3, a control diagram outlines the basic decisions and functionality of the DAA. A performance tracker circuit (e.g., performance tracker circuit 102 as shown in FIG. 2) uses the performance model to estimate the timeline of a given workload (e.g., amount of time needed to complete processing of a workload) from one or more statistics. In various examples, several recent samples of the estimated vs. actual timelines are saved for comparison purposes. In various examples, a significant change in the error value between the estimate and actual timelines for the recent samples indicates a shift in the system workload level for the GPU and DDR, and is used to determine when and which of the transfer functions are invoked by the performance tracker circuit. In various examples, a first transfer function comes into play after the system workload level for the GPU and DDR workload has been evaluated. In the case of a steady workload (for example, several frames of graphic processing without a frequency change), the first transfer function tries to find a more optimal Operating Performance Point (OPP) using the search patterns further described and shown below in FIGS. 5A-C. The first transfer function can also rely on an energy model as part of the first transfer function to determine an OPP that provides an optimal level of system performance while reducing power consumption of the GPU and DDR to a minimum.

In various examples, the second transfer function will be invoked when a new frequency request is issued by the performance tracker circuit indicative of a change in the system workload level of the GPU and DDR. A new frequency request can include a request to raise the operating frequency of the GPU, or to lower the operating frequency of the GPU. The second transfer function is operable to evaluate the new frequency request, and to determine if adjustments to the operating frequency of the GPU, the DDR, or both the GPU and the DDR should be made. In various examples, the second transfer function determines of frequency adjustments have recently been made by first transfer function as a basis for determining if any of the operating frequencies should be adjusted.

In some other and more conventional techniques, GPU/ DDR frequency controllers use only linear estimates of headroom based on current frequency and busy times. These other models that use linear estimates of headroom can be inaccurate and can result in either performance issues or across the board power increase. These other techniques tend to settle at local power minimums to preserve performance. In various examples of the present application, and in contrast to these other systems, examples of the dynamic adjustment algorithms (DAAs) described herein keep re-evaluating to find true power optimized frequency sets and a global energy minimum.

In some example techniques described in this disclosure, using the energy and performance models in the transfer functions allows the DAA to make far fewer errors while cutting power margins. The performance tracking portion of the DAA helps the algorithm respond speedily to true workload shifts while responding moderately to slight fluctuations. Combined together, these features as described in the examples provided herein represent a power saving and performance gain over some other techniques that rely on the guess and check algorithms techniques.

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 10 may include instructions that cause CPU 6 and/or GPU 12 to perform the functions ascribed in this disclosure to CPU 6 and GPU 12. Accordingly, system memory 10 may be a computer-readable storage medium having instructions stored thereon that, when executed, cause one or more processors (e.g., CPU 6 and GPU 12) to perform various functions.

In some examples, system memory 10 is a non-transitory storage medium. The term "non-transitory" indicates that the storage medium is not embodied in a carrier wave or a propagated signal. However, the term "non-transitory" should not be interpreted to mean that system memory 10 is non-movable or that its contents are static. As one example, system memory 10 may be removed from computing device 2, and moved to another device. As another example, memory, substantially similar to system memory 10, may be inserted into computing device 2. In certain examples, a non-transitory storage medium may store data that can, over time, change (e.g., in RAM).

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 and CPU 6 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to local memory 14. Thus, GPU 12 may read data from and write data to local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. Local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

As described, CPU 6 may offload graphics processing to GPU 12, such as tasks that require massive parallel operations. As one example, graphics processing requires massive parallel operations, and CPU 6 may offload such graphics processing tasks to GPU 12. However, other operations such as matrix operations may also benefit from the parallel processing capabilities of GPU 12. In these examples, CPU 6 may leverage the parallel processing capabilities of GPU 12 to cause GPU 12 to perform non-graphics related operations.

In the techniques described in this disclosure, a first processing unit (e.g., CPU 6) offloads certain tasks to a second processing unit (e.g., GPU 12). To offload tasks, CPU 6 outputs commands to be executed by GPU 12 and data that are operands of the commands (e.g., data on which the commands operate) to system memory 10 and/or directly to GPU 12. GPU 12 receives the commands and data, directly from CPU 6 and/or from system memory 10, and executes the commands. In some examples, rather than storing commands to be executed by GPU 12, and the data operands for the commands, in system memory 10, CPU 6 may store the commands and data operands in a local memory that is local to the IC that includes GPU 12 and CPU 6 and shared by both CPU 6 and GPU 12 (e.g., local memory 14). In general, the techniques described in this disclosure are applicable to the various ways in which CPU 6 may make available the commands for execution on GPU 12, and the techniques are not limited to the above examples.

The rate at which GPU 12 executes the commands is set by the frequency of a clock signal (also referred to as a clock rate or operation frequency of GPU 12). For example, GPU 12 may execute a command every rising or falling edge of the clock signal, or execute one command every rising edge and another command every falling edge of the clock signal. Accordingly, how often a rising or falling edge of the clock signal occurs within a time period (e.g., frequency of the clock signal) sets how many commands GPU 12 executes within the time period.

In some examples, such as those where CPU 6 stores commands to be executed by GPU 12 in memory (e.g., system memory 10 or a local memory), CPU 6 may output memory address information identifying a group of commands that GPU 12 is to execute. The group of commands that GPU 12 is to execute is referred to as submitted commands. In examples where CPU 6 directly outputs the commands to GPU 12, the submitted commands includes those commands that CPU 6 instructs GPU 12 to execute immediately.

There may be various ways in which CPU 6 may group commands. As one example, a group of commands includes all the commands needed by GPU 12 to render one frame. As another example, a group of commands may be so-called "atomic commands" that are to be executed together without GPU 12 switching to other commands. Other ways to group commands that are submitted to GPU 12 may be possible, and the disclosure is not limited to the above example techniques.

In some cases, GPU 12 may need to execute the submitted commands within a set time period. For instance, computing device 2 may be handheld device, where display 18 also functions as the user interface. As one example, to achieve a stutter free (also referred to as jank-free) user interface, GPU 12 may need to complete execution of the submitted commands within approximately 16 milliseconds (ms), assuming a frame rate of 60 frames per second (other time periods are possible). This 16 ms time period may be referred to as a "vsync" window, and if GPU 12 does not complete execution of the submitted commands within the vsync window, there may be "bubbles" in an execution pipeline of GPU 12 causing a jank filled user interface.

The "bubbles" in the execution pipeline of GPU 12 refers to conditions where units of GPU 12 that are executing the commands have partially completed the execution of the commands to produce some intermediate data, but units of GPU 12 that are to receive the intermediate data are still busy executing other commands causing the intermediate data to keep building. For instance, the execution pipeline of GPU 12 includes a series of units that each produce intermediate data that is further processed by the next unit in the series (i.e., in the pipeline). In some cases, upstream units of an execution pipeline of GPU 12 are producing intermediate data faster than downstream units of the execution pipeline of GPU 12 can consume, creating a so-called bubble.

The amount of commands that CPU 6 submits and the timing of when CPU 6 submits commands need not necessarily be constant. There may be an influx or reduction in the number of commands GPU 12 is to execute. For example, the application executing on CPU 6 (e.g., a third-party application) may increase or decrease the number of commands to be executed by GPU 12, or an operating system executing on CPU 6 (e.g., the framework itself) may increase or decrease the number of commands to be executed by GPU 12. As another example, CPU 6 may submit a first group of commands at time 0, a second group of commands at time 1, and a third group of commands at time 2. However, the time interval between the submission of the first group of commands and the second group of commands may be different than the time interval between the submission of the second group of commands and the third group of commands.

Because the amount of commands GPU 12 is to execute within a set time period (e.g., 16 ms) may change, the frequency of the clock signal of GPU 12 (i.e., the clock rate of GPU 12 or the operation frequency of GPU 12) may need to increase or decrease so that GPU 12 is able to execute the commands within the set time period, without unnecessarily increasing power consumption. The amount of commands GPU 12 needs to execute within the set time period may change because there are more or fewer commands in a group of commands that need to be executed within the set time period, because there is an increase or decrease in the number of groups of commands that need to be executed within the set time period, or a combination of the two.

If the frequency of the clock signal were permanently kept at a relatively high frequency, then GPU 12 would be able to timely execute the submitted commands in most instances. However, executing commands at a relatively high frequency causes the power consumption of GPU 12 to increase. If the frequency of the clock signal were permanently kept at a relatively low frequency, then the power consumption of GPU 12 may be reduced, but GPU 12 may not be able to timely execute submitted commands in most instances, leading to janky behavior and possibly other unwanted effects.

For example, the voltage applied to GPU 12 or components within the GPU 12 sets the operation frequency. A relatively high voltage sets a relatively higher frequency and a relatively low voltage sets a relatively low frequency. Accordingly, setting GPU 12 to operate at a relatively high frequency results in GPU 12 consuming more power than setting GPU 12 to operate at a relatively low frequency because the voltage level needed to operate GPU 12 at the high frequency is greater than the voltage level needed to operate GPU 12 at the low frequency.

A frame, as used in this disclosure, refers to a full image that can be presented. The frame includes a plurality of pixels that represent graphical content, with each pixel having a pixel value. For instance, after GPU 12 renders a frame, GPU 12 stores the resulting pixel values of the pixels of the frame in a frame buffer, which may be in system memory 10. Display interface 16 receives the pixel values of the pixels of the frame from the frame buffer and outputs values based on the pixel values to cause display 18 to display the graphical content of the frame. In some examples, display interface 16 causes display 18 to display frames at a rate of 60 frames per second (fps) (e.g., a frame is displayed approximately every 16.67 ms).

To ensure that GPU 12 is operating at a high enough operation frequency to ensure that the 60 fps requirement is met, but not too high, CPU 6 may determine a busy level of GPU 12. The busy level refers to the amount of time GPU 12 was executing commands during the time interval. Considered another way, the busy level indicates how many GPU cycles (e.g., clock cycles of GPU 12) were used during the time interval. The busy level measurement may be in units of time, and may be sometimes represented as a percentage (e.g., amount of time busy divided time interval multiplied by 100). In general, the busy level refers to the amount of time it takes GPU 12 to complete a workload.

GPU 12 may include circuitry that increments a counter every time a unit within GPU 12 stores data to and/or reads data from one or more general purpose registers (GPRs), or increments a counter every time any component within GPU 12 performs a function. Multiple components may perform a function during a clock cycle, but the counter increments only once if one or more components perform a function during the clock cycle. At the conclusion of the time interval, CPU 6 may determine the number of times the units within GPU 12 accessed the one or more GPRs or determine the number of times any component with GPU 12 performed a function during the clock cycle. For instance, CPU 6 may determine the difference between counter values at the beginning and end of a time period.

The counter values may be a good approximation of the number of clock cycles used during a period of time over which the clock rate is determined. Based on the clock rate of GPU 12 during the period of time and the number of clock cycles used during the period of time, CPU 6 may determine the amount of time that GPU 12 was busy during the period of time. For instance, the number of clock cycles used multiplied by the period of clock rate of GPU 12 indicates the amount of time that GPU 12 was busy completing the workload (e.g., busy level of GPU 12).

The above is one example way in which CPU 6 determines the busy level of GPU 12. The techniques described in this disclosure are not limited to this specific example which to determine the busy level of GPU 12. There may be multiple different ways to determine the busy level of GPU 12, and CPU 6 may employ one or more of the different ways to determine the busy level of GPU 12.

CPU 6 may then determine whether to increase or decrease the clock rate of GPU 12. For example, if the busy level is greater than a first threshold, CPU 6 may increase the clock rate of GPU 12 and if the busy level was less than a second threshold, CPU 6 may decrease the clock rate of GPU 12. The first threshold and second threshold may be different thresholds or the same threshold. In some examples, there may be multiple thresholds from which CPU 6 can determine how much to increase or decrease the clock rate of GPU 12.

The example techniques described in this disclosure describe ways in which CPU 6 may determine the clock rate of GPU 12. Additionally, CPU 6 may determine the clock rate of system memory 10. The clock rate of system memory 10 controls the bus bandwidth of bus 20, as it sets how much data can be sent or received from system memory 10 via bus 20. As described in more detail, CPU 6 may perform one or more functions associated with the performance tracker circuit (shown in FIG. 2). As described in further detail below, performance tracker circuit 102 is operable to call one or more transfer functions (e.g., transfer function one 104, transfer function two 106 shown in FIG. 3), to determine whether to adjust the operating frequencies for GPU 12 and/or the system memory bus DDR associated with system memory 10 and or local memory 14. For instance, CPU 6 operates the performance tracker circuit 102 to invoke these transfer functions, and to utilize the one or more example techniques described herein to determine the clock rate of GPU 12 and/or system memory 10 and local memory 14.

FIG. 2 is a block diagram illustrating components of the device illustrated in FIG. 1 in greater detail. As illustrated in FIG. 2, CPU 6 includes a performance tracker circuit 102. Performance tracker circuit 102 may be implemented in hardware as a circuit, software, or firmware executing on hardware of CPU 6, and is operable to execute software that causes the CPU to perform various functions, including invoking one or more transfer functions as described herein. The performance tracker circuit 102 is operable to monitor the system workload level of GPU 12 and the system memory bus associated with system memory 10, and issue new frequency requests that cause the one or more transfer functions to adjust a clock frequency for GPU 12, to adjust a clock frequency for system memory bus associated with system memory 10, or to adjust both a clock frequency for GPU 12 and a clock frequency for the system memory bus associated with system memory 10. Performance tracker circuit 102 is operable to issue new frequency requests based on an error signal that indicates a shift in the system workload level of GPU 12 and system memory 10. In addition, performance tracker circuit 102 is operable to monitor the system workload level of GPU 12 and system memory 10 when no error signal is present indicating a shift in the system workload level, and to invoke one or more of the transfer functions during this period of stable system workload levels to determine if a more optimal operating performance point is available for GPU 12 and system memory 10. If a more optimal operating performance point is available during one of these periods of stable system workload levels, performance tracker circuit 102 is operable to make, using determinations for the clock frequency or frequencies made using the one or more transfer functions, adjustments to the operating frequency setting(s) for GPU 12, for the system memory bus associated with system memory 10, or for both GPU 12 and for the system memory bus associated with system memory 10.

As further illustrated in FIG. 2, GPU 12 includes controller 30, oscillator 34, counter registers 35, shader core 36, and fixed-function pipeline 38. Shader core 36 and fixed-function pipeline 38 may together form an execution pipeline used to perform graphics or non-graphics related functions. Although only one shader core 36 is illustrated, in some examples, GPU 12 may include one or more shader cores similar to shader core 36.

The commands that GPU 12 is to execute are executed by shader core 36 and fixed-function pipeline 38, as determined by controller 30 of GPU 12. Controller 30 may be implemented as hardware on GPU 12 or software or firmware executing on hardware of GPU 12.

Controller 30 may receive commands that are to be executed from command buffer 40 of system memory 10 or directly from CPU 6 (e.g., receive the submitted commands that CPU 6 determined should now be executed by GPU 12). Controller 30 may also retrieve the operand data for the commands from data buffer 42 of system memory 10 or directly from CPU 6. For example, command buffer 40 may store a command to add A and B. Controller 30 retrieves this command from command buffer 40 and retrieves the values of A and B from data buffer 42. Controller 30 may determine which commands are to be executed by shader core 36 (e.g., software instructions are executed on shader core 36) and which commands are to be executed by fixed-function pipeline 38 (e.g., commands for units of fixed-function pipeline 38).

In some examples, commands and/or data from one or both of command buffer 40 and data buffer 42 may be part of local memory 14 of GPU 12. For instance, GPU 12 may include an instruction cache and a data cache, which may be part of local memory 14 that stores commands from command buffer 40 and data from data buffer 42, respectively. In these examples, controller 30 may retrieve the commands and/or data from local memory 14.

Shader core 36 and fixed-function pipeline 38 may transmit and receive data from one another. For instance, some of the commands that shader core 36 executes may produce intermediate data that are operands for the commands that units of fixed-function pipeline 38 are to execute. Similarly, some of the commands that units of fixed-function pipeline 38 execute may produce intermediate data that are operands for the commands that shader core 36 is to execute. In this way, the received data is progressively processed through units of fixed-function pipeline 38 and shader core 36 in a pipelined fashion. Hence, shader core 36 and fixed-function pipeline 38 may be referred to as implementing an execution pipeline.

In general, shader core 36 allows for various types of commands to be executed, meaning that shader core 36 is programmable and provides users with functional flexibility because a user can program shader core 36 to perform desired tasks in most conceivable manners. The fixed-function units of fixed-function pipeline 38, however, are hardwired for the manner in which the fixed-function units perform tasks. Accordingly, the fixed-function units may not provide much functional flexibility.

As also illustrated in FIG. 2, GPU 12 includes oscillator 34. Oscillator 34 outputs a clock signal that sets the time instances when shader core 36 and/or units of fixed-function pipeline 38 execute commands. Although oscillator 34 is illustrated as being internal to GPU 12, in some examples, oscillator 34 may be external to GPU 12. Also, oscillator 34 need not necessarily just provide the clock signal for GPU 12, and may provide the clock signal for other components as well, including the system memory and/or a system memory bus. Oscillator 34 may generate a square wave, a sine wave, a triangular wave, or other types of periodic waves. Oscillator 34 may include an amplifier to amplify the voltage of the generated wave, and output the resulting wave as the clock signal for GPU 12.

In some examples, on a rising edge or falling edge of the clock signal outputted by oscillator 34, shader core 36 and each unit of fixed-function pipeline 38 may execute one command. In some cases, a command may be divided into sub-commands, and shader core 36 and each unit of fixed-function pipeline 38 may execute a sub-command in response to a rising or falling edge of the clock signal. For instance, the command of A+B includes the sub-commands to retrieve the value of A and the value of B, and shader core 36 or fixed-function pipeline 38 may execute each of these sub-commands at a rising edge or falling edge of the clock signal.

The rate at which shader core 36 and units of fixed-function pipeline 38 execute commands may affect the power consumption of GPU 12. For example, if the frequency of the clock signal outputted by oscillator 34 is relatively high, shader core 36 and the units of fixed-function pipeline 38 may execute more commands within a time period as compared the number of commands shader core 36 and the units of fixed-function pipeline 38 would execute for a relatively low frequency of the clock signal. However, the power consumption of GPU 12 may be greater in instances where shader core 36 and the units of fixed-function pipeline 38 are executing more commands in the period of time (due to the higher frequency of the clock signal from oscillator 34) than compared to instances where shader core 36 and the units of fixed-function pipeline 38 are executing fewer commands in the period of time (due to the lower frequency of the clock signal from oscillator 34).

In some examples, the frequency of the clock signal outputted by oscillator 34 is a function of the voltage applied to oscillator 34 (which may be the same as the voltage applied to GPU 12, but not necessary in every example). For instance, the frequency of the clock signal outputted by oscillator 34 is higher for a higher voltage than the frequency of the clock signal outputted by oscillator 34 for a lower voltage. Accordingly, the frequency of the clock signal outputted by oscillator 34 is a function of the power consumption of oscillator 34 (or GPU 12 more generally). By controlling the frequency of the clock signal outputted by oscillator 34, CPU 6 may control the overall power consumption.

As described above, CPU 6 may offload tasks to GPU 12 due to the massive parallel processing capabilities of GPU 12. For instance, GPU 12 may be designed with a single instruction, multiple data (SIMD) structure. In the SIMD structure, shader core 36 includes a plurality of SIMD processing elements, where each SIMD processing element executes same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 12 to perform many tasks in parallel (e.g., at the same time). For such SIMD structured GPU 12, each SIMD processing element may execute one thread on a rising edge or falling edge of the clock signal.

To avoid confusion, this disclosure uses the term "command" to generically refer to a process that is executed by shader core 36 or units of fixed-function pipeline 38. For instance, a command includes an actual command, constituent sub-commands (e.g., memory call commands), a thread, or other ways in which GPU 12 performs a particular function. Because GPU 12 includes shader core 36 and fixed-function pipeline 38, GPU 12 may be considered as executing the commands.

Also, in the above examples, shader core 36 or units of fixed-function pipeline 38 execute a command in response to a rising or falling edge of the clock signal outputted by oscillator 34. However, in some examples, shader core 36 or units of fixed-function pipeline 38 may execute one command on a rising edge and another, subsequent command on a falling edge of the clock signal. There may be other ways in which to "clock" the commands, and the techniques described in this disclosure are not limited to the above examples.

Because GPU 12 executes commands every rising edge, falling edge, or both, the frequency of clock signal (also referred to as clock rate) outputted by oscillator 34 sets the amount of commands GPU 12 can execute within a certain time. For instance, if GPU 12 executes one command per rising edge of the clock signal, and the frequency of the clock signal is 1 MHz, then GPU 12 can execute one million commands in one second.

As illustrated in FIG. 2, CPU 6 executes application 26, as illustrated by the dashed boxes. During execution, application 26 generates commands that are to be executed by GPU 12, including commands that instruct GPU 12 to retrieve and execute shader programs (e.g., vertex shaders, fragment shaders, compute shaders for non-graphics applications, and the like). In addition, application 26 generates the data on which the commands operate (i.e., the operands for the commands). CPU 6 stores the generated commands in command buffer 40, and stores the operand data in data buffer 42.

After CPU 6 stores the generated commands in command buffer 40, CPU 6 makes available the commands for execution by GPU 12. For instance, CPU 6 communicates to GPU 12 the memory addresses of a set of the stored commands and their operand data and information indicating when GPU 12 is to execute the set of commands. In this way, CPU 6 submits commands to GPU 12 for executing.

As illustrated in FIG. 2, CPU 6 may also execute graphics driver 28. In some examples, graphics driver 28 may be software or firmware executing on hardware or hardware units of CPU 6. Graphics driver 28 may be configured to allow CPU 6 and GPU 12 to communicate with one another. For instance, when CPU 6 offloads graphics or non-graphics processing tasks to GPU 12, CPU 6 offloads such processing tasks to GPU 12 via graphics driver 28. For example, when CPU 6 outputs information indicating the amount of commands GPU 12 is to execute, graphics driver 28 may be the unit of CPU 6 that outputs the information to GPU 12.

As additional examples, application 26 produces graphics data and graphics commands, and CPU 6 may offload the processing of this graphics data to GPU 12. In this example, CPU 6 may store the graphics data in data buffer 42 and the graphics commands in command buffer 40, and graphics driver 28 may instruct GPU 12 when to retrieve the graphics data and graphics commands from data buffer 42 and command buffer 40, respectively, from where to retrieve the graphics data and graphics commands from data buffer 42 and command buffer 40, respectively, and when to process the graphics data by executing one or more commands of the set of commands.

Also, application 26 may require GPU 12 to execute one or more shader programs. For instance, application 26 may require shader core 36 to execute a vertex shader and a fragment shader to generate pixel values for the frames that are to be displayed (e.g., on display 18 of FIG. 1). Graphics driver 28 may instruct GPU 12 when to execute the shader programs and instruct GPU 12 with where to retrieve the graphics data from data buffer 42 and where to retrieve the commands from command buffer 40 or from other locations in system memory 10. In this way, graphics driver 28 may form a link between CPU 6 and GPU 12.

Graphics driver 28 may be configured in accordance to an application processing interface (API); although graphics driver 28 does not need to be limited to being configured in accordance with a particular API. In an example where computing device 2 is a mobile device, graphics driver 28 may be configured in accordance with the OpenGL ES API. The OpenGL ES API is specifically designed for mobile devices. In an example where computing device 2 is a non-mobile device, graphics driver 28 may be configured in accordance with the OpenGL API.

The amount of commands in the submitted commands may be based on the commands needed to render one or more frames of the user-interface or gaming application. For the user-interface example, GPU 12 may need to execute the commands needed to render one frame of the user-interface within the vsync window (e.g., 16 ms) to provide a jank-free user experience. If there is a relatively large amount of content that needs to be displayed, then the amount of commands may be greater than if there is a relatively small amount of content that needs to be displayed. To ensure that GPU 12 is able to execute the submitted commands within the set time period, controller 30 may adjust the frequency (i.e., clock rate) of the clock signal that oscillator 34 outputs. However, to adjust the clock rate of the clock signal such that the clock rate is high enough to allow GPU 12 to execute the submitted commands within the set time period, controller 30 may receive information indicating whether to increase, decrease, or keep the clock rate of oscillator 34 the same. In some examples, controller 30 may receive information indicating a specific clock rate for the clock signal that oscillator 34 outputs. In the techniques described in this disclosure, frequency management module 32 may be configured to determine the clock rate of the clock signal that oscillator 34 outputs as well as the clock rate of the clock signal that oscillator 44 outputs based on control signals received from performance tracker circuit 102 and generated by the one or more transfer functions described herein. Oscillator 44 may be include in computing device 2, such as in CPU 6, in a memory controller (not shown), or elsewhere in computing device 2 to control the operating frequency of memory 10.

In the techniques described in this disclosure, frequency management module 32 may be configured to, using the DAA techniques described herein, determine the clock rate (s) of the clock signal that oscillator 34 and oscillator 44 outputs. Frequency management module 32, also referred to as dynamic clock and voltage scaling (DCVS) module, is illustrated as being software executing on CPU 6. However, frequency management module 32 may be hardware on CPU 6 or a combination of hardware and software or firmware. As described in more detail, frequency management module 32 may perform the example techniques described with respect to FIGS. 3 and 4 to determine the clock rate of oscillator 34 as well as a clock rate of an oscillator 44 of system memory 10.

Figure 3:
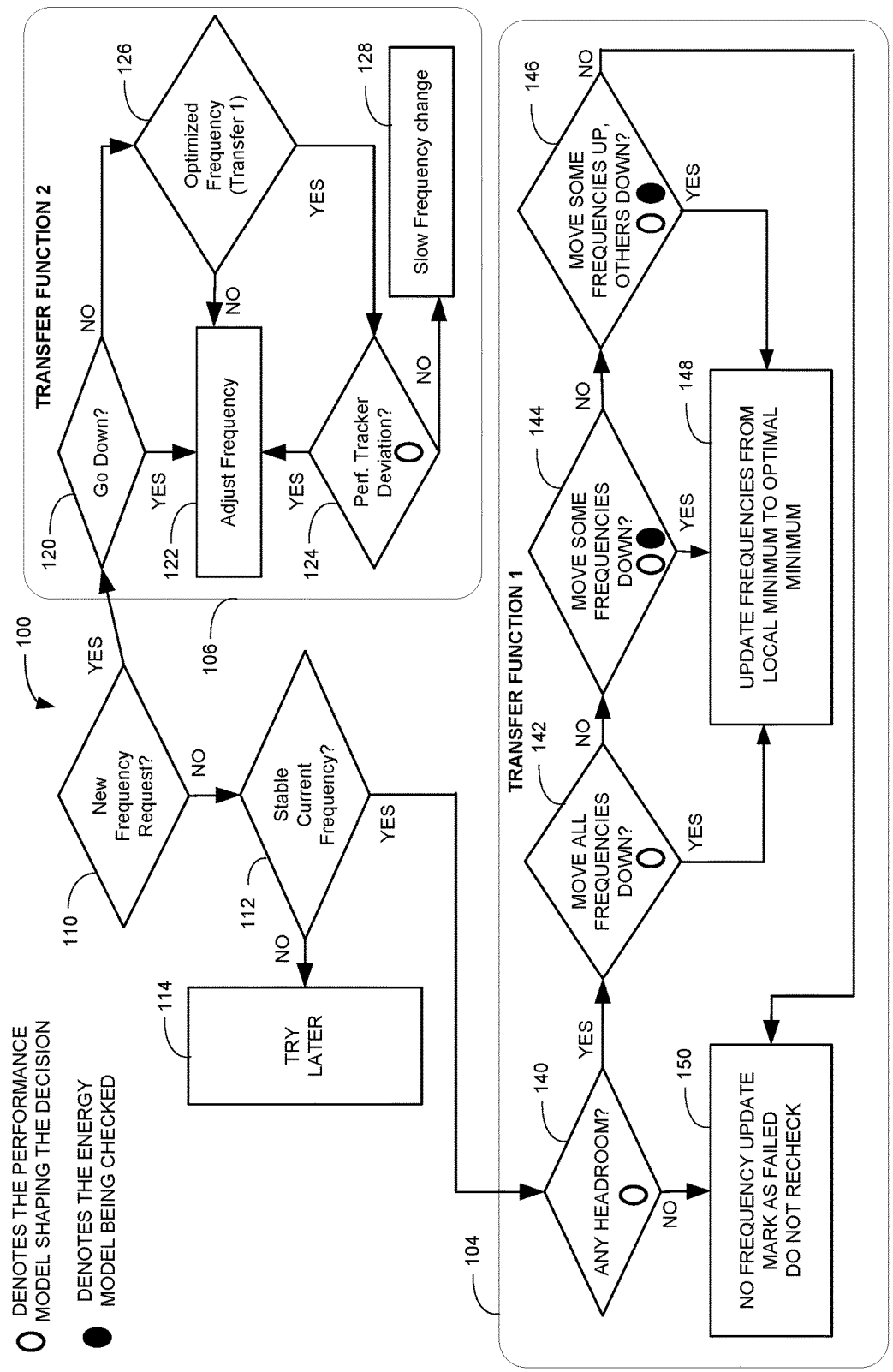
FIG. 3 is a flowchart illustrating various control decisions and functionality in accordance with one or more example techniques described in this disclosure.
Figure 4:
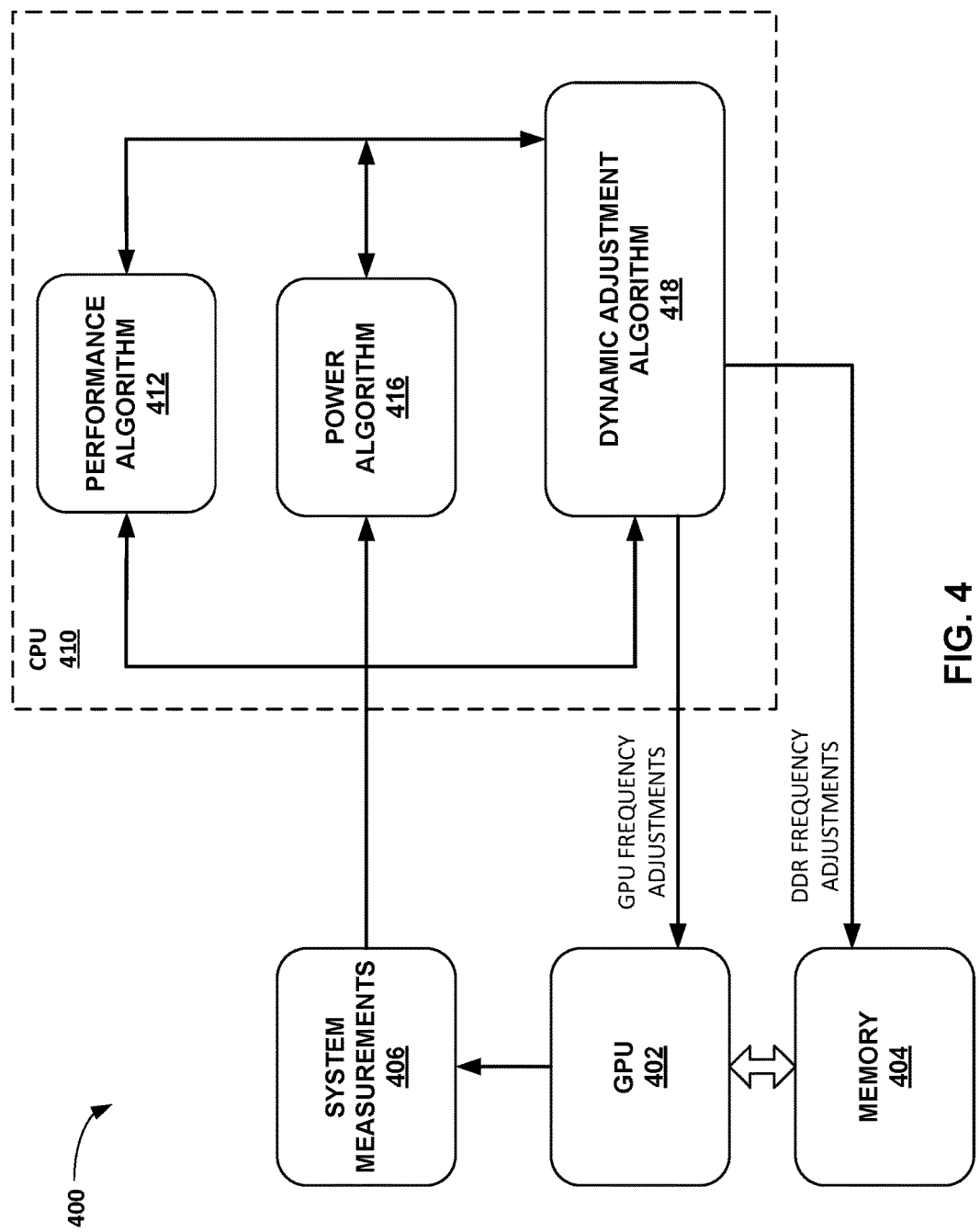
FIG. 4 is a block diagram illustrating an example implementation of a graphics system.

FIG. 3 is a block diagram 100 illustrating various control decisions and functionality in accordance with one or more example techniques described in this disclosure. The techniques illustrated in FIG. 3 may be performed by CPU 6, such as by frequency management module 32, as shown in FIG. 2, or in various examples by CPU 410 as shown in FIG. 4. In some examples, CPU 6 and GPU 12 (e.g., via controller 30) may implement the example techniques. In some examples, CPU 6 in combination with some other component(s) may perform the example techniques. GPU 12 may perform the techniques described in this disclosure without assistant from CPU 6. However, the techniques are not limited to being performed by GPU 12, CPU 6, or CPU 410, and are operable to be utilized on other graphics systems. Other permutations are possible, and for ease of description, the examples are described with respect to CPU 6 performing the examples illustrated in FIG. 3. Also, the example techniques described in FIG. 3 may be performed by software or by firmware executing on a processing unit, via hardware units of a processing unit, or a combination thereof.

Block diagram 100 includes a first transfer function (transfer function one 104), and a second transfer function (transfer function two 106). The performance tracker circuit 102, as described above with respect to FIG. 2 is operable to provide outputs that invoke the first transfer function, the second transfer function, or in some instances both the first transfer function and the second transfer function, as further described below with respect to block diagram 100. The first transfer function and the second transfer function use one or more performance models to estimate one or more timelines of a given workload. For example, a performance model may be based on a timeline for rendering one or more graphics primitives to display a video frame. In another example, a performance model may be based on a timeline for performing a particular function or functions related to system memory. In various examples, performance tracker circuit 102 uses performance algorithm 412 as described below with respect to FIG. 4, although examples of performance models used by performance tracker circuit 102 are not limited to performance algorithm 412.

Referring again to performance tracker circuit 102 and FIG. 3, in various examples several recent samples of the estimated timeline versus the actual timelines for the system workload level are saved for comparison purposes. For example, the last two or three samples of a timeline for performing a particular workload are stored. In various examples, the estimated timelines and the actual timelines for system workload levels are stored in a graphics driver, such as graphics driver 28, running on a CPU, such as CPU 6, both as shown in FIG. 2. However, the location or locations where the system workload level estimated timelines and actual timelines are stored is not limited to any particular location(s), and can be stored in system memory or local memory accessible to performance tracker circuit 102. In addition, example implementations do not require that the estimated timelines be stored in a same location as the actual timelines. As described herein, the estimated timelines in various examples are one or more timelines calculated by using the performance model. The performance tracker circuit 102 is operable to compare one or more recent actual timelines for a particular workload to an estimated timeline for the particular workload, and to generate an error level based on a difference between estimated timelines for performing these tasks versus the actual timeline used to perform these tasks as represented by the last two or three samples. In various examples, a change in the error level between the estimated and actual timelines is used to indicate a shift in the system's workload. In various examples, the level of error detected is stored for use in the transfer functions.

For example, if the performance tracker circuit 102 determines that the change in the error level between the estimated and actual timelines for a workload exceeds a threshold value, performance tracker circuit 102 can issue a new frequency request 110. In various examples, a new frequency request 110 will cause transfer function two 106 to be invoked.

In various examples, if performance tracker circuit 102 determines that a change in error level that has occurred between the estimated and actual timeline for a workload is not significant, (for example does not exceed a threshold value based on one or more parameters and no new frequency request is being issued), the performance tracker circuit 102 determines that a stable workload condition exists, and can initiate a stable current frequency procedure 112. The one or more parameters are not limited to any particular type of parameter, and for example can be based on a time interval that has passed without a change in the error level. In another example, the parameter is a measure of whether or not, after some number of samples have been taken with respect to workload, any change in the error level has exceeded a threshold value.

In various examples, initiating the stable current frequency procedure 112 will activate transfer function one 104. In the alternative, the stable current frequency procedure 112 does not activate transfer function one 104, and instead waits for some time period as represented by the TRY LATER 114 block. A decision to not activate the stable current frequency procedure 112 is not limited to any particular decision criteria, and in some examples can be based on a determination of when the last adjustment to the frequency of the GPU, the frequency of the DDR, or the frequencies of both the GPU and the DDR were made using the stable current frequency procedure 112. The decision to not activate the stable current frequent procedure 112 can be based on weighing the amount of calculation(s) needed to run the procedure against the added potential benefit of invoking transfer function one 104 to further optimizing the system operating frequencies.

Referring now to transfer function two 106, in various examples, this transfer function will be invoked when the recommendation of the performance tracker circuit 102 is to change the GPU frequency (e.g., there is a new frequency request issued by the performance tracker circuit 102). In various examples, a new frequency request that comprises a recommendation to decrease frequency (GO DOWN? 120 block) may be always honored immediately. In such instances, the clock frequency of GPU 12 is adjusted as illustrated by the ADJUST FREQUENCY 122 block. In the alternative, if the new frequency request comprises a recommendation to increase frequency, then the OPTIMIZE FREQUENCY 126 block is activated. In various examples, OPTIMIZE FREQUENCY block 126 determines if a frequency correction has recently been issued by transfer function one 104. In various examples, a determination of whether the transfer function one 104 has recently issued a frequency correction is based on predetermined time limit that has expired during which no frequency corrections were made by transfer function one 104. In other examples, a determination of whether the transfer function one 104 has recently issued a frequency correction is based on whether or not a predetermined number of GPU operations have been performed without having transfer function one 104 perform a frequency correction. If the OPTIMIZE FREQUENCY 126 block determines that no frequency corrections has been recently issued by the transfer function one 104, recommendations from the performance tracker circuit 102 to move up the GPU and/or DDR frequency or frequencies are also approved, and the frequency of GPU 12, system memory bus associated with system memory 10, or both, are adjusted via the ADJUST FREQUENCY 122 block.

If in the alternative, at block 126 the frequency correction has not recently been issued by the transfer function one 104, the remaining case is that the performance tracker circuit 102 is recommending an upward frequency adjustment while the dynamic adjustment algorithm has corrected at least one frequency in a downward direction. At this point, the performance tracker circuit 102 is checked to see if a system workload level shift has been noted at block 124. If so, the frequency set for GPU 12 and/or the system memory bus associated with system memory 10 and/or local memory 14 may be immediately moved up via the ADJUST FREQUENCY 122 block. In various examples, this adjustment is based on the assumption that a true workload change benefits from a fast response. However, if the performance tracker circuit 102 seems to indicate the GPU/system memory bus is maintaining a stable (even) workload level over several previous workload samples, the dynamic adjustment algorithm will delay the rise of frequencies at least until the next sample of the workload level is taken. At that point, further requests to move up the frequency of the GPU will be treated with one frequency rising at a time, as represented by the SLOW FREQUENCY CHANGE 128 block.

Referring now to transfer function one 104, in various examples the first transfer function comes into play after a workload has been evaluated, for example by performance tracker circuit 102. In the case of a stable workload (several frames without a frequency change) the first transfer function is invoked and attempts to find a more optimal Operating Performance Point (OPP) using the search pattern shown for transfer function one 104. A check for basic headroom is done at the ANY HEADROOM? block 140. If it appears that GPU 12 and the DDR (e.g., system memory) are both operating at tight capacity, no action is taken, as represented by the NO FREQUENCY UPDATE 150 block. In various examples, "tight capacity" exists when the system is operating at an OPP, and therefore no adjustments to the frequency of the GPU and/or the DDR would improve both the performance and power consumption parameters of the system. In some examples, "tight capacity" does not include cases that show significant stall cycles in either the GPU or the DDR indicating that the GPU or the DDR is waiting for the other device. If this specific case (stall cycles) is detected, in some examples the first transfer function is operable to skip directly to a MOVE SOME FREQUENCIES UP, OTHERS DOWN? 146 block that is further described below in order to achieve optimization of the performance of the GPU and DDR system in view of the bottleneck created by either the GPU or the DDR operating frequency.

If there is headroom, the performance algorithm is run to decide if it is possible to lower both the GPU and DDR frequencies, as represented by the MOVE ALL FREQUENCIES DOWN? 142 block. If both the GPU and the DDR frequencies can be lowered, the frequencies will be adjusted based on the determination made at block 142, as depicted by the UPDATE FREQUENCIES FROM LOCAL MINIMUM TO OPTIMAL MINIMUM 148 block. If lowering both the GPU and the DDR frequencies does not meet one or more performance specifications, as further described above, the performance model of transfer function one 104 will be used to check lowering the non-blocking frequency, illustrated by the MOVE SOME FREQUENCIES DOWN? 144 block. In various examples, the non-blocking frequency is defined as the frequency of the component (GPU or system memory bus) which is not the bottleneck of the system. In various examples, identifying the bottleneck is an additional output of the performance algorithm. In various examples, the GPU frequency is the bottleneck frequency, and in other examples, the system memory bus frequency is the bottleneck frequency. If a determination is made at block 144 that at least one of the GPU frequency or the DDR frequency can be lowered, the performance model is satisfied, and the energy algorithm will be then run to determine if the combination of moving just one frequency down is an energy optimization. If the energy model is satisfied, the frequency of either the GPU or the DDR will be adjusted downward based on the determination made at block 144, as depicted by the UPDATE FREQUENCIES FROM LOCAL MINIMUM TO OPTIMAL MINIMUM 148 block.

If the performance check determines that neither the GPU nor the DDR frequencies can be lowered, a final check will be run on the combined actions of lowering the non-blocking frequency but also raising the bottleneck frequency, as shown by the MOVE SOME FREQUENCIES UP, OTHERS DOWN? 146 block. If the performance model is satisfied that one of these frequencies can be moved up when the other frequency is moved down, the energy algorithm will be then run to determine if the combination of moving one frequency up and the other frequency down is an energy optimization. If the energy model is satisfied, the frequencies will be adjusted based on the outcome of block 146 as depicted by the UPDATE FREQUENCIES FROM LOCAL MINIMUM TO OPTIMAL MINIMUM 148 block. In various examples, if this first search pattern fails to find a better OPP, transfer function one 104 does not issue a recommendation to changes the frequency of the GPU or of the DDR, and no action is taken, as represented by the NO FREQUENCY UPDATE 150 block. In such instances, in various examples a second and a third search pattern will be run on subsequent calls to the transfer function one 104.

In various examples, the DDR is shared by the GPU with one or more other components. For example, a modem can share use of the DDR with the GPU. In some examples, a determination to change a clock frequency for the DDR made by the techniques described herein result in a "vote" to change the clock frequency, and is entered into a voting scheme that ultimately determines whether or not to adjust the clock frequency of the DDR. In some examples, one or more devices that share the DDR with the GPU would also have a vote as to whether the clock frequency of the DDR should be adjusted. In such examples, the vote from one of the voting devices can be weighted by some factor depending on how important the device's vote is with respect to determining the setting of the clock frequency for the DDR. However, the voting scheme is not limited to any particular type of voting, weighted or otherwise, in making the determination as to whether the clock frequency for the DDR will be adjusted. In various examples, a request for adjustment to the clock frequency of the DDR is not a vote, even if the DDR is shared with the GPU by other devices, and a decision to adjust the clock frequency generated by any of the devices or methods described herein are executed to adjust the clock frequency for the DDR regardless of the status of any other devices that might share the DDR with the GPU.

FIG. 4 is a block diagram illustrating an example implementation of a graphics system 400. As illustrated in FIG. 4, system 400 includes a graphics processing unit (GPU) 402 coupled to a memory 404. In various examples, GPU 402 is GPU 12 as shown in FIG. 1 and FIG. 2, and memory 404 is system memory 10 as shown in FIG. 1 and FIG. 2, local memory 14 as shown in FIG. 1, or a combination of system memory 10 and local memory 14, although example implementations of GPU 402 and memory 404 are not limited to being the examples as illustrated and described with respect to FIG. 1 and FIG. 2.

Referring again to FIG. 4, system measurements 406 are derived from the operation of GPU 402 and memory 404, and are provided to CPU 410. The measurements included in system measurements 406 are not limited to any particular type of system measurements, and can include any measurements, including but not limited to the example measurements described herein, that can be provided as inputs to CPU 410 regarding the performance of GPU 402 and memory 404. As shown in FIG. 4, system measurements 406 are provided to a performance algorithm 412, to a power algorithm 416, and to a dynamic adjustment algorithm 418. In various examples, each of performance algorithm 412, power algorithm 416, and dynamic adjustment algorithm 418 are executed by CPU 410. In various examples, one or more of performance algorithm 412, power algorithm 416, and dynamic adjustment algorithm 418 are provided at least in part as hardware circuits.

In various examples, the performance algorithm 412 is operable to provide information on the relevant performance level combinations of the GPU operating frequency and memory operating frequency, and can be used to determine if a given combined level of a particular GPU operating frequency and a particular memory operating frequency will meet a set of system performance requirements. The performance algorithm compares actual timelines for a given workload or task to timeline estimates for the same workload or task based on a performance model. Performance models are developed based on a model of the GPU system to which the performance algorithm 412 is to be applied, and in general is based on how the blocks of the system are fit together. Estimates for times to complete various workloads on the GPU system can be obtained by running the performance model of a given workload or task with various sets of operating frequencies for the GPU and the DDR to determine what the OPP points are for these sets of operating frequencies. In various examples, this algorithm cannot be cycle level accurate, wherein "cycle level accurate" means accurate to within one of the GPU's clock cycles. In various examples, the performance model will be consistent for a given workload but not necessarily exactly match the actual measured time that the GPU is running, and in such examples provides a likelihood (probability) that given combination of GPU operating frequency and memory operating frequency will be successful at meeting the system performance requirements.

In various examples, the power algorithm 416 is operable to provide power estimates for each combined level of GPU and memory operating frequencies of interest. As with the performance algorithm 412, in various examples the power algorithm 416 is an estimate of power for these proposed combinations of GPU and memory operating frequencies. In various examples, the power algorithm 416 is based on an energy model, examples of the energy model further described below. In various examples, the dynamic adjustment algorithm 418 provides a core of system 400. The dynamic adjustment algorithm 418 is operable to determine which combination of proposed operating frequencies for GPU 402 and memory 404 should run based at least in part on information derived from one or both of the performance algorithm 412 and the power algorithm 416. The dynamic adjustment algorithm 418 is also responsible for selecting the operating levels to apply as the operating frequencies for the GPU 402, for the memory 404, or both the GPU 402 and the memory 404, and is responsible for error correction if the yielded performance based on these applied operating frequencies is insufficient to meet the system performance requirements. The dynamic adjustment algorithm 418 is responsible for adjusting operating frequencies of GPU 402 and/or memory 404 to larger workload changes. Dynamic adjustment algorithm 418 is further operable to determine if a more optimal operating point (OPP) can be located that still meets the system performance requirements when the GPU 402 and memory 404 have been operating at a stable workload level for some period of time.

In various examples, the performance algorithm 412 is operable to read in specific measurements related to the operation of GPU 402 and memory 404, and calculate the desired performance output. In various examples, which combined levels of frequencies are tested, and when they are tested is, controlled by the dynamic adjustment algorithm 418. In various examples, the performance algorithm 412 receives as an input the count of various events inside GPU that are representative of the amount of data transfer and computation for a specific time period (at frame granularity), and estimates the total time it takes to finish the computation at different Operating Performance Points (OPP). For any practical GPU, there are multiple performance controls (Bus BW, Core Clock, etc.) that affect both performance and power. The effect these controls have can be non-linear, and can be inter-dependent. When implementing a performance algorithm, it is ideal to know the effects that performance control changes will have on the workload processing time before those changes are made. This is problematic because full models tend to be large, and computation heavy. Various examples described herein solve the problem by creating a performance model that is also practical to implement in a real system. The result enables more optimal performance algorithms. In various examples, performance algorithm 412 uses a performance model that divides the GPU into logical sub-units. Each sub-unit is calibrated (non-realtime) and computed (realtime) separately, and the computation results are combined to yield the desired performance prediction. The result may be a GPU performance model that is accurate enough to be useful, but also compact and efficient enough to be used at run-time. In various examples, the performance model is to be able to, at any point of time, identify all the OPPs that would provide the required performance to meet the system performance requirements, including but not limited to a performance requirement for a deadline for rendering a graphic frame. The approach taken for this step is to create a model that predicts the total draw time of a frame based on some workload specific statistics, as well as the GPU and DDR frequencies.

In various examples, workload statistics are captured at runtime using performance counters included as part of the performance tracker circuit 102. Performance counter can be any physical register, implemented in hardware or software, operable to store information, including counter values, related to various events related to the GPU system. In various examples, the workload statistics include the time spent on data transfer to/from memory. In various examples, this includes all memory interactions during vertex shading, fragment shading, and texture fetching in processing a graphic frame. In various examples, the workload statistics include the time spent in arithmetic logic unit (ALU) operations. In various examples, the workload statistics include the time spent in texture sampling operations. These examples are illustrative, and are not intended to in any manner limit the range of system measurements or techniques that could be used by performance algorithm 412 to generate performance information related to GPU 402 and memory 404.

In various examples, the power algorithm 416 is operable to read in system measurements provided by system measurements 406 and/or provided by performance algorithm 412, and calculate the desired output related to energy management and power consumption related to system 400. In general, the energy model is based on extensive profiling of the GPU and DDR systems being fitted to a set of linear equations. In various examples the power algorithm 416 uses the energy model to pick a next set of OPPs in a given direction (e.g. move both the GPU and DDR operating frequencies, or move just one of GPU or DDR frequencies, move both the GPU and DDR frequencies but in opposite directions) and feeds the proposed operating frequencies through the energy model to determine if the overall energy efficiency of the GPU and DDR system would be improved if this set of operating frequencies were utilized by the system.

In various examples, the energy model receives as input the count of various events inside GPU that are representative of computation and data transfer for a specific time period (frame granularity preferred), and estimates the total amount of energy consumed. In various examples, the energy model does not have to be exact in its estimations. In various examples, fidelity across OPPs is more important as the energy model is going to be used to select the most energy efficient OPP. In various examples, the energy model can be developed using extensive power and performance profiling. In various examples, in order to obtain the data, example techniques capture performance profiling information using performance counters at frame level granularity. At the same time, example techniques measure power consumption, align power measurement data with the performance data, and extract per frame total energy.

Various examples also, separately, estimate energy consumption during frame idle time and sum the two up. In various examples, idle energy can be estimated depending on the power saving ratio related to power collapse during the idle time. Additionally, various examples capture some workload dependent events (these events are independent of OPP) using performance counters. Examples of workload events include a number of submissions to the GPU, and a number of threads/application making submissions to the GPU. These events are representative of the amount of computation, as well as data transfer, to and from the DDR. Using the workload dependent and OPP dependent data (performance and power), various examples develop statistical models for energy consumption. One of the design decisions refers to a decision to use a set of linear equations to comprise the energy model with separate coefficients per OPP. In some examples, of the energy model comprises fitting one energy model per OPP. Doing so increases the memory footprint of the power algorithm, but does not affect the runtime performance of the algorithm. An advantage of this approach is that the quadratic relationship between voltage and power/energy is taken out of the picture, model generation is simplified, and the accuracy of the generated model is increased. Simplifying model generation is one of the contributing factors to having a semi-automated model generation flow for different chipsets that might be used to implement system 400. Simple linear regression works well for eliminating the need for a data mining expert or complicated tools.

In various examples, which combined levels of frequencies for GPU 402 and memory 404 are tested, and when they are tested, is controlled by the dynamic adjustment algorithm 418. In various examples, dynamic adjustment algorithm 418 ultimately determines a GPU frequency or frequency adjustment for GPU 402, and also determines a DDR frequency or a frequency adjustment for memory 404. As these frequencies are applied to GPU 402 and memory 404, the system measurements 406 are again determined, and fed back to CPU 410 to repeatedly provide a closed loop regulation of the frequencies for both GPU 402 and for memory 404.

In conventional graphics systems, the performance is often generalized as being purely a function of one factor, specifically graphics core frequency. However, there are often multiple factors that affect performance, such as the bus bandwidth. Further, the power effects of performance control selection are complex. In order to try to manage these complexities, conventional systems make simplifications to guide the selection of levels to achieve lower power. By using the combination of the performance algorithm 412, power algorithm 416, and the dynamic adjustment algorithm 418 as described herein, a reduction in power without affecting performance can be accomplished for graphical systems, including but not limited to the graphical systems described herein. Various example implementations and techniques that employ these algorithms to achieve these objectives are described herein for combining predicted GPU performance and power consumption levels with dynamic adjustment algorithm to achieve optimal power and performance.

In this context, design space refers to the collection of OPPs (all permutations of GPU and DDR frequencies). In various examples, the example implementations and techniques as described herein include generally following steps:
  using the performance model, filter out those OPPs that if used, frame deadline will be missed, remaining OPPs would be the "feasible OPP group."
  using the energy model, estimate energy consumption for the OPPs within the "feasible OPP group."
  select the most energy efficient OPP across the "feasible OPP group."
  update GPU and DDR frequencies (voltages or operating frequencies) according to the selected OPP.

In various examples, the first step starts with a set of OPPs and returns a subset of those OPPs that would meet the required deadline. In order to generate the OPP subset, the performance algorithm 412 has to feed workload statistics to the performance model for each OPP at its input. With the increasing number of OPPs, the computation required for this step can potentially become very costly. It could result in negative performance impact, but more importantly, it might result in considerable energy overhead that negates or diminishes the energy saving the GPU DCVS is going to provide. In various examples, the design space is operable to reduce the performance overhead related to sweeping all OPPs by eliminating some of the OPPs before running through performance and/or energy model. An importance difference between this component and conventional approaches is that in various examples of the approach as disclosed herein, the performance and power algorithms statically, at design time, eliminate some of the OPPs.

Figure 5A:
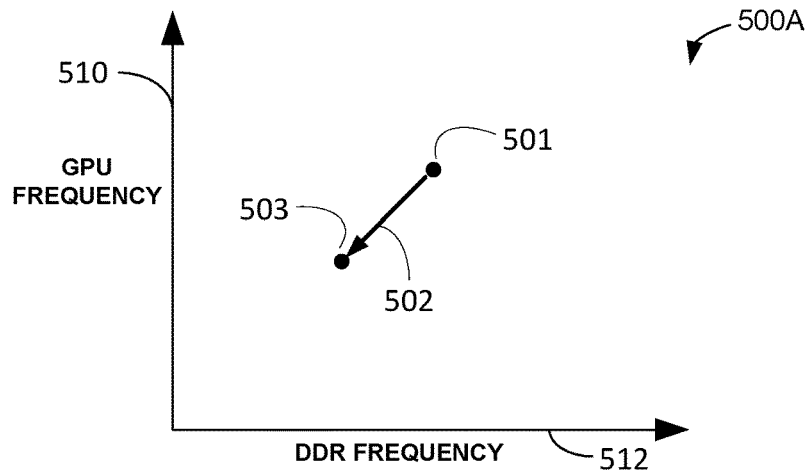
FIGS. 5A-C are graphs illustrating examples of search patterns according to one or more example techniques described in this disclosure.
Figure 5B:
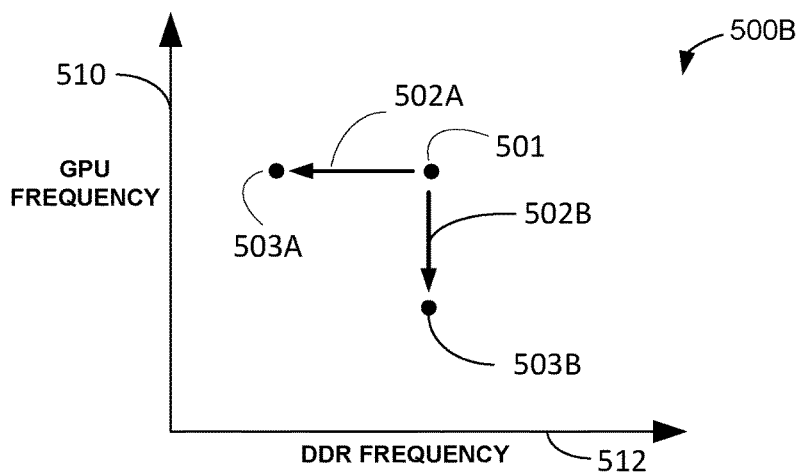
Figure 5C:
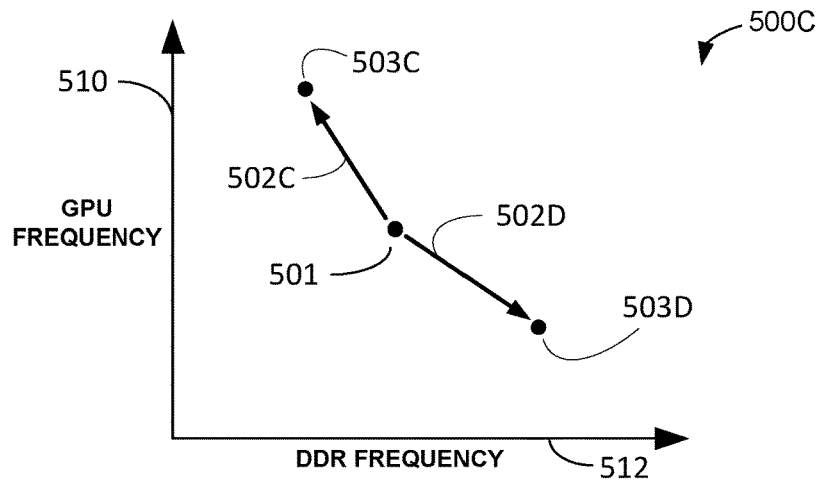

FIGS. 5A-C illustrate graphs (500A, 500B, 500C) of examples of search patterns according to one or more example techniques described in this disclosure. Each of graphs 500A, 500B, and 500C include a vertical GPU frequency axis (510) and a horizontal DDR frequency axis (512). Each graph illustrates an Operating Performance Point (OPP) Space having a GPU frequency represented by the vertical axis and a DDR frequency represented by the horizontal axis, forming an X-Y coordinate space. In FIGS. 5A-C, the point (501) depicts a hypothetical existing operating performance point, having a GPU frequency indicated by the Y-position of point 501 relative to the GPU frequency axis 510, and a DDR frequency indicated by the X-position of point 501 relative to the DDR frequency axis 512. Search patterns (502, 502A, 502B, 502C, 502D) represent examples of search pattern flows that are used to find a more optimal Operating Performance Point (OPP) 503, 503A, 503B, 503C, or 503D. In various examples, a transfer function, such as transfer function one 104 as described in the present disclosure, uses a search pattern such as search pattern 502, 502A, 502B, 502C, or 502D to try to find a more optimal OPP than the OPP depicted by existing point 501.

In various examples, the transfer function makes a check for basic headroom relative to the current frequencies that the GPU and the DDR are operating at, as represented by point 501 in graph 500A. If it appears the GPU and the DDR are both operating at tight capacity with little or no headroom, no action is taken. In various examples, the transfer function runs the performance algorithm to determine if it is possible to lower both the GPU and DDR frequencies. A search pattern 502 is performed, and if a more optimal OPP is located, the frequencies of the GPU and the DDR are adjusted to the new OPP illustrated as point 503 in graph 500A.

In various examples, if lowering both the GPU frequency and the DDR frequency does not meet performance specifications, the performance model will be used to check lowering the non-blocking frequency. In various examples, the non-blocking frequency is defined as the frequency of the component which is not the bottleneck of the system. In various examples, identifying the bottleneck is an additional output of the performance algorithm. In various examples, the GPU is the bottleneck frequency and so the GPU frequency cannot be lowered, but the DDR frequency may be able to be lowered without affecting system performance, and resulting in a more energy efficient OPP. A search pattern illustrated by search pattern 502A illustrated in graph 500B shows a search for an OPP 503A having a same GPU frequency, but a lower DDR frequency. In various examples, if the new OPP 503A shown in graph 500B satisfies the energy model, the DDR frequency will be lowered, while the GPU operating frequency will remain the same. In the alternative, in various examples the DDR is the bottleneck frequency, and so the DDR frequency cannot be lowered, but the GPU frequency may be able to be lowered without affecting system performance, and resulting in a more energy efficient OPP. A search pattern illustrated by search pattern 502B illustrated in graph 500B shows a search for an OPP 503B having a same DDR frequency, but a lower GPU operating frequency. In various examples, if the new OPP 503B shown in graph 500B satisfies the energy model, the GPU frequency will be lowered, while the DDR operating frequency will remain the same.

In various examples, if the performance check shows that neither of the operating frequencies for the GPU or the DDR can simply be lowered, a check will be run on the combined actions of lowering the non-blocking frequency but raising the bottleneck frequency. In examples where the GPU frequency is determined to be the bottleneck frequency, search pattern 502C as shown in graph 500C can be implemented to locate a new OPP 503C having a raised operating frequency for the GPU, but also lowering the operating frequency for the DDR. If new OPP 503C satisfies the energy model, the GPU operating frequency will be raised and the DDR operating frequency will be lowered to establish OPP 503C as shown in graph 500C as the new OPP for a graphics system. In examples where the DDR frequency is determined to be the bottleneck frequency, search pattern 502D as shown in graph 500C can be implemented to locate a new OPP 503D having a raised operating frequency for the DDR, but also lowering the operating frequency for the GPU. If new OPP 503D satisfies the energy model, the DDR operating frequency will be raised and the GPU operating frequency will be lowered to establish OPP 503B as shown in graph 500C as the new OPP or the graphic system.

Thus, as described above, the transfer function can be used to adjust frequencies based on the outcome of the steps in the transfer function and the search patterns described above. In various examples, all of the search patterns 502, 502A, 502B, 502C, and 502D are run on each call to the transfer function. In various examples, not all of these search patterns are run on a given call to the transfer function, and in such instances if a first search pattern fails to find a better OPP during a call to the transfer function, one or more of the search patterns will be run again on subsequent call(s) to the transfer function.

Figure 6:
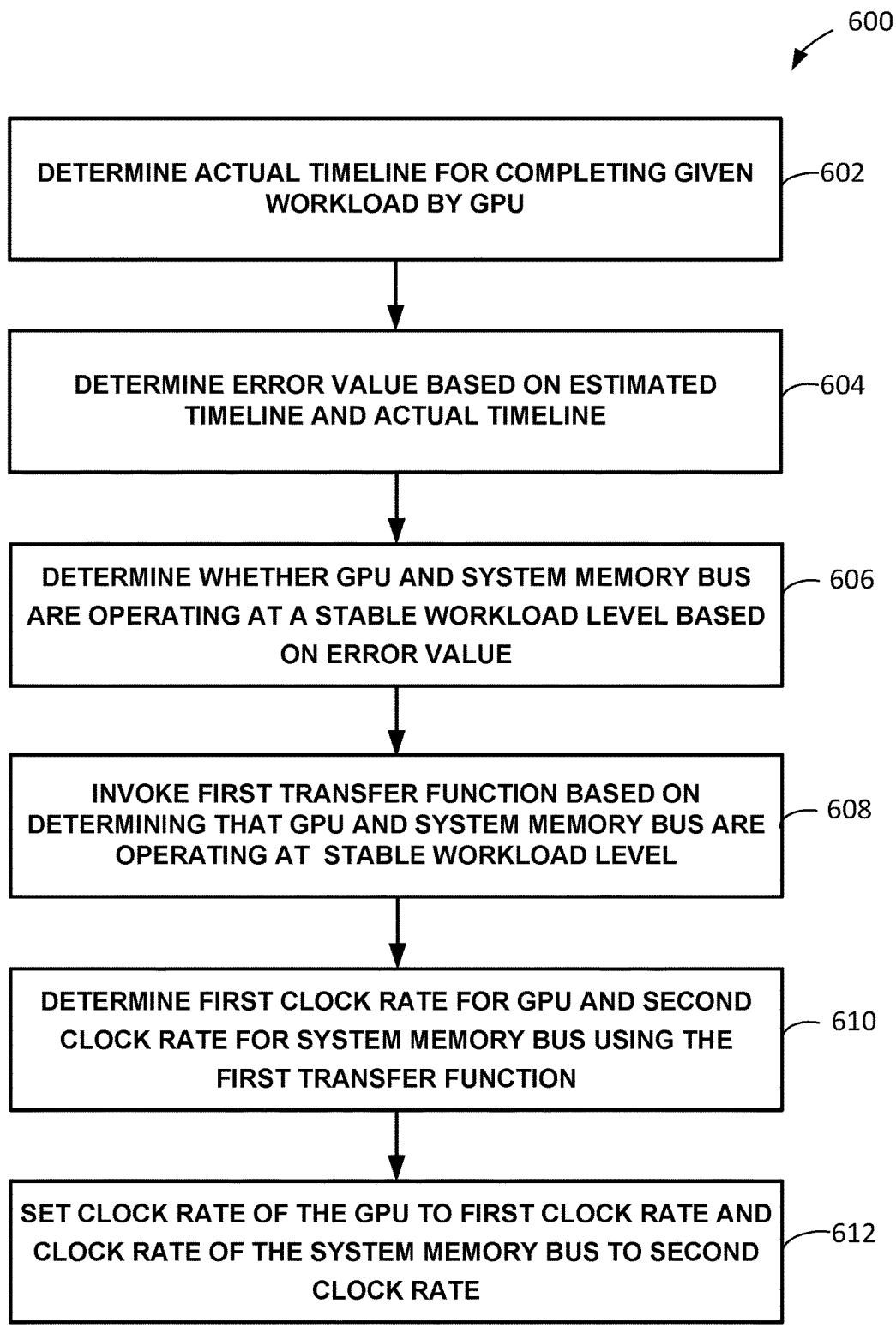
FIG. 6 is a flowchart illustrating an example method of clock rate determination according to techniques described in this disclosure.

FIG. 6 is a flowchart illustrating example methods 600 of clock rate determination in accordance with one or more of the techniques described in this disclosure. Although the example methods 600 are described with respect to CPU 6, the methods are not limited to being executed by CPU 6, and can be executed by other CPUs and/or graphical processing units associated with graphics systems. In various examples, CPU 410 as illustrated and described respect to FIG. 4 is operable to perform the method steps of example method 600. In addition, GPU 12 and memory 10 are referred to as the GPU and the DDR for which operating frequencies are being determined, although the example methods 600 are not limited to determining the operating frequencies for GPU 12 and system memory 10. In various examples, the operating frequencies for GPU 12 and system memory 10 are determined using the techniques included in example methods 600.

As illustrated in FIG. 6, at block 602 a host processor (e.g., CPU 6) determines an actual timeline for completing a given workload by a graphics processing unit (GPU). At block 604, the host processor determines an error value based on comparing the actual timeline to an estimated timeline for completing the given workload. At block 606, the host processor determines whether at least the GPU and a system memory bus are operating at a stable workload level based on the error value. In various examples, operating at a stable workload level indicates that no significant changes in a system workload level have occurred over a plurality of workload samples processed by the GPU. At block 608, the host processor invokes a first transfer function based on a determination that the GPU and the system memory bus are operating at a stable workload level. At block 610, the host processor uses the first transfer function to determining a first clock rate for the GPU and a second clock rate for a system memory bus based on a determination that the GPU and the system memory bus are operating at the stable workload level. At block 612, the host processor sets a clock rate of the GPU to the first clock rate and a clock rate of the system memory bus to the second clock rate.

In various examples, the host processor issues a new frequency request, wherein the new frequency request is issued when the GPU and the system memory bus are not operating at the stable workload level, the host processor further invokes a second transfer function based on the issuance of the new frequency request, determines, using the second transfer function, a third clock rate for the GPU, and sets the clock rate of the GPU to the third clock rate. In various examples, the host processor determines that the new frequency request comprises a request to raise the GPU frequency, determines, using the second transfer function, that no frequency corrections have recently been made by the first transfer function, determines, using the second transfer function, a third clock rate for the GPU and a fourth clock rate for the system memory bus, and sets the clock rate of the GPU to the third clock rate and the clock rate of the system memory bus to the fourth clock rate.

In various examples, the host processor determines whether any headroom exists relative to a current set of clock rates at which the GPU and the system memory bus are operating, wherein determining the first clock rate for the GPU and the second clock rate for the system memory bus comprises determining an update to the clock rate for the GPU and an update to the clock rate for the system memory bus based on the determination that the headroom exists. In various examples, the host processor determines the first clock rate for the GPU and the second clock rate for the system memory bus including lowering the first clock rate for the GPU and lowering the second clock rate for the system memory bus. In various examples, the host processor determines the first clock rate for the GPU and the second clock rate for the system memory bus including lowering the first clock rate for the GPU and not lowering the second clock rate for the system memory bus. In various examples, the host processor determines the first clock rate for the GPU and the second clock rate for the system memory bus including lowering the second clock rate for the system memory bus and not lowering the first clock rate for the GPU. In various examples, the host processor determines the first clock rate for the GPU and the second clock rate for the system memory bus including: lowering the first clock rate for the GPU or lowering the second clock rate for the system memory bus, and raising the first clock rate for the GPU based on the second clock rate for the system memory bus being lowered, or raising the second clock rate of system memory bus based on the first clock rate for the GPU being lowered.

In various examples, the host processor performs a search pattern related to changing the first clock rate of the GPU only, changing the second clock rate of the system memory bus only, or changing both the first clock rate of the GPU and the second clock rate of the system memory bus to determine an optimal performance point with respect to performance and power consumption for the GPU and the system memory bus. In various examples, the host processor performs the search pattern that is initiated based on a determination that the GPU and the system memory bus are operating at the stable workload level during a time interval, the time interval including a period of time during which one or more samples of the actual timeline for completing the given workload have been taken.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims. Any of the examples and techniques as described above can be applied in combination with or separately from the examples and techniques described in any of the description, figures, Appendix or Appendixes, and claims as presented herein, including the examples, techniques, and other disclosure as provided below.

What is claimed is:

1. A method of clock rate determination comprising:
   determining, with a host processor, an actual timeline for completing a given workload by a graphics processing unit (GPU);
   determining, with the host processor, an error value based on comparing the actual timeline to an estimated timeline for completing the given workload;
   determining whether at least the GPU and a system memory bus are operating at a stable workload level based on the error value, wherein the GPU and the system memory bus are operating at the stable workload level when the determined error value indicates that no significant changes in a system workload level have occurred over a plurality of workload samples processed by the GPU, and wherein no significant changes in the system workload level have occurred over the plurality of workload samples processed by the GPU when a predetermined number of graphic frames have been rendered by the GPU without a frequency change to a clock rate of the GPU or to a clock rate of the system memory bus;
   invoking, with the host processor, a first transfer function based on a determination that the GPU and the system memory bus are operating at the stable workload level;
   determining, with the host processor and using the first transfer function, a first clock rate for the GPU and a second clock rate for the system memory bus based on the determination that the GPU and the system memory bus are operating at the stable workload level; and
   setting the clock rate of the GPU to the first clock rate and the clock rate of the system memory bus to the second clock rate.

2. The method of claim 1, further comprising:
   issuing, from the host processor, a new frequency request, wherein the new frequency request is issued when the GPU and the system memory bus are not operating at the stable workload level;
   invoking, with the host processor, a second transfer function based on the issuance of the new frequency request;
   determining, with the host processor and using the second transfer function, a third clock rate for the GPU; and
   setting the clock rate of the GPU to the third clock rate.

3. The method of claim 2, further comprising:
   determining, with the host processor, that the new frequency request comprises a request to raise the GPU frequency;
   determining, with the host processor and using the second transfer function, that no frequency corrections have recently been made by the first transfer function;
   determining, with the host processor and using the second transfer function, the third clock rate for the GPU and a fourth clock rate for the system memory bus; and
   setting the clock rate of the GPU to the third clock rate and the clock rate of the system memory bus to the fourth clock rate.

4. The method of claim 1, further comprising:
   determining whether any headroom exists relative to a current set of clock rates at which the GPU and the system memory bus are operating, wherein determining the first clock rate for the GPU and the second clock rate for the system memory bus comprises determining an update to the clock rate for the GPU and an update to the clock rate for the system memory bus based on the determination that the headroom exists.

5. The method of claim 1, wherein determining the first clock rate for the GPU and the second clock rate for the system memory bus includes lowering the first clock rate for the GPU and lowering the second clock rate for the system memory bus.

6. The method of claim 1, wherein determining the first clock rate for the GPU and the second clock rate for the system memory bus includes either lowering the first clock rate for the GPU and not lowering the second clock rate for the system memory bus, or lowering the second clock rate for the system memory bus and not lowering the first clock rate for the GPU.

7. The method of claim 1, wherein determining the first clock rate for the GPU and the second clock rate for the system memory bus includes:
lowering the first clock rate for the GPU or lowering the second clock rate for the system memory bus, and
raising the first clock rate for the GPU based on the second clock rate for the system memory bus being lowered, or raising the second clock rate of system memory bus based on the first clock rate for the GPU being lowered.

8. The method of claim 1, further comprising:
performing a search pattern related to changing the first clock rate of the GPU only, changing the second clock rate of the system memory bus only, or changing both the first clock rate of the GPU and the second clock rate of the system memory bus to determine an optimal performance point with respect to performance and power consumption for the GPU and the system memory bus.

9. The method of claim 8, wherein performing the search pattern is initiated based on a determination that the GPU and the system memory bus are operating at the stable workload level during a time interval, the time interval including a period of time during which one or more samples of the actual timeline for completing the given workload have been taken.

10. A device for clock rate determination comprising:
a graphics processing unit (GPU) configured to operate at a first clock rate, the first clock rate being adjustable;
a system memory bus coupled to the GPU, the system memory bus configured to operate at a second clock rate, the second clock rate configured to be adjustable independently of the first clock rate; and
a host processor configured to:
determine an actual timeline for completing a given workload by the GPU;
determine an error value based on comparing the actual timeline to an estimated timeline for completing the given workload;
determine whether at least the GPU and a system memory bus are operating at a stable workload level based on the error value, wherein the GPU and the system memory bus are operating at the stable workload level when the determined error value indicates that no significant changes in a system workload level have occurred over a plurality of workload samples processed by the GPU when a predetermined number of graphic frames have been rendered by the GPU without a frequency change to the first clock rate of the GPU or to the second clock rate of the system memory bus;
invoke a first transfer function based on a determination that the GPU and the system memory bus are operating at the stable workload level;
determine, using the first transfer function, the first clock rate for the GPU and the second clock rate for the system memory bus based on the determination that the GPU and the system memory bus are operating at the stable workload level; and
set a clock rate of the GPU to the first clock rate and a clock rate of the system memory bus to the second clock rate determined using the first transfer function.

11. The device of claim 10, wherein the host processor further comprises:
a performance tracker circuit configured to issue a new frequency request when the error value indicates that the GPU and the system memory bus are not operating at the stable workload level; and
based on the issuance of the new frequency request, the host processor is configured to invoke a second transfer function to determine if the new frequency request comprises a request to lower the clock rate for the GPU, and if the new frequency request comprises a request to lower the clock rate for the GPU, to set the first clock rate for the GPU to a lower clock frequency.

12. The device of claim 11, wherein the host processor is further configured to:
determine that the new frequency request comprises a request to raise the clock rate for the GPU;
determine that no frequency corrections have recently been made by the first transfer function; and
raise the first clock rate for the GPU based on the new frequency request comprising a request to raise the clock rate for the GPU and a determination that no frequency corrections have recently been made by the first transfer function.

13. The device of claim 11, wherein the host processor is configured to:
determine that the new frequency request comprises a request to raise the clock rate for the GPU; and
check the performance tracker circuit to determine that a system workload level shift has been indicated by the performance tracker circuit indicative of an increase in the system workload level, and in response, to raise at least one of the first clock rate for the GPU and the second clock rate for the system memory bus.

14. The device of claim 11, wherein the host processor is configured to:
determine that the new frequency request comprises a request to raise the clock rate for the GPU; and
check the performance tracker circuit to determine that the performance tracker circuit has provided an indication of a stable workload, and in response, to delay increasing the first clock frequency of the GPU and the second clock frequency of the system memory bus until another sample of the system workload level has been taken.

15. The device of claim 10, wherein the host processor is configured to determine, using the first transfer function, whether any headroom exists relative to a current set of clock rates at which the GPU and the system memory bus are operating, and determine, using the first transfer function, the first clock rate for the GPU and the second clock rate for the system memory bus based on the determination that the headroom exists.

16. The device of claim 10, wherein the host processor is configured to lower the first clock rate for the GPU and to also lower the second clock rate for the system memory bus based on the determination that the GPU and the system memory bus are operating at the stable workload level.

17. The device of claim 10, wherein the host processor is configured to lower the first clock rate for the GPU and not lower the second clock rate for the system memory bus based on the determination that the GPU and the system memory bus are operating at the stable workload level.

18. The device of claim 10, wherein the host processor is configured to lower the second clock rate for the system memory bus and not lower the first clock rate for the GPU based on the determination that the GPU and the system memory bus are operating at the stable workload level.

19. The device of claim 10, wherein determining the first clock rate for the GPU and the second clock rate for the system memory bus comprises:
based on the determination that the GPU and the system memory bus are operating at the stable workload level, lowering the first clock rate for the GPU or lowering the second clock rate for the system memory bus, and
raising the first clock rate for the GPU based on the second clock rate for the system memory bus being lowered, or raising the second clock rate of system memory bus based on the first clock rate for the GPU being lowered.

20. A non-transitory computer readable medium comprising instructions for causing a programmable processor to:
determine an actual timeline for completing a given workload by a graphic processing unit (GPU);
determine an error value based on comparing the actual timeline to an estimated timeline for completing the given workload;
determine whether at least the GPU and a system memory bus are operating at a stable workload level based on the error value, wherein the GPU and the system memory bus are operating at the stable workload level when the determined error value indicates that no significant changes in a system workload level have occurred over a plurality of workload samples processed by the GPU when a predetermined number of graphic frames have been rendered by the GPU without a frequency change to a clock rate of the GPU or to a clock rate of the system memory bus;
invoke a first transfer function based on the determination that the GPU and the system memory bus are operating at the stable workload level;
determine, using the first transfer function, a first clock rate for the GPU and a second clock rate for the system memory bus based on the determination that the GPU and the system memory bus are operating at the stable workload level; and
set the clock rate of the GPU to the first clock rate and the clock rate of the system memory bus to the second clock rate.

\* \* \* \* \*